IMAGE TRANSDUCERS USING EXTRINSIC PHOTOCONDUCTORS

Filed April 1, 1966 4 Sheets-Sheet 1

INVENTOR.
R. K. H. GEBEL
BY Harry A. Herbert Jr
ATTORNEY
James S. Shannon
AGENT

INVENTOR.
R.K.H. GEBEL
BY Harry A. Herbert Jr
ATTORNEY
James S. Shannon
AGENT

Dec. 9, 1969 R. K. H. GEBEL 3,483,320

IMAGE TRANSDUCERS USING EXTRINSIC PHOTOCONDUCTORS

Filed April 1, 1966 4 Sheets-Sheet 3

INVENTOR.
R. K. H. GEBEL
BY Harry A. Herbert Jr
ATTORNEY
James L. Shannon
AGENT

Dec. 9, 1969 R. K. H. GEBEL 3,483,320

IMAGE TRANSDUCERS USING EXTRINSIC PHOTOCONDUCTORS

Filed April 1, 1966 4 Sheets-Sheet 4

INVENTOR.
R. K. H. GEBEL
BY Harry A. Herbert Jr
ATTORNEY
James S. Shannon
AGENT

United States Patent Office 3,483,320

Patented Dec. 9, 1969

3,483,320
IMAGE TRANSDUCERS USING EXTRINSIC PHOTOCONDUCTORS

Radames K. H. Gebel, Dayton, Ohio, assignor to the United States of America as represented by the Secretary of the Air Force Filed Apr. 1, 1966, Ser. No. 540,167
Int. Cl. H04n 3/00, 5/38
U.S. Cl. 178—6.8 5 Claims

ABSTRACT OF THE DISCLOSURE

Photoconductive optical image transducers for low quantum energy radiations having increased sensitivity due to controlled erasure which permits the effective collection of photons over all or substantially all of the frame interval. The transducers employ as target plates for the optical image extrinsic semiconductors having a donor energy level in the forbidden gap. One embodiment is a modified vidicon having a vertical sweep time that is a small fraction of the vertical sweep repetition interval and having means for flooding the target plate during vertical retrace with light of the proper quantum energy to effect erasure. In another embodiment, the semiconductor target which receives the image is in mesh form. In cyclically repeated steps the target is brought to a uniform potential, allowed to require a potential distribution in accordance with image intensity distribution, subjected to a stream of electrons which it intensity modulates in accordance with the potential distribution and which impinges on a phosphor to produce a visual image, and is flooded by light of the proper quantum energy to effect erasure.

Figure 1:
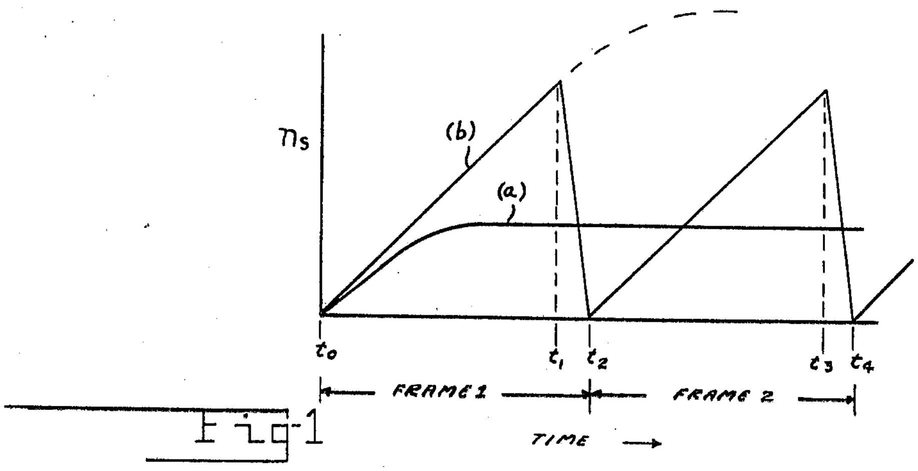

The invention described herein may be manufactured and used by or for the United States Government for governmental purposes without the payment to me of any royalty thereon.

This invention relates to image transducers capable of following motion which use semiconductors as radiation detecting elements and which, in order to follow motion, require by some process a periodic erasure of the information carriers in the conduction band of the semiconductor. The purposes of this invention are to increase the sensitivity of image transducers of this type and to extend the spectral range of their photodetectors to include radiations having insufficient quantum energy to raise electrons from the valence band to the conduction band of the semiconductors used as the photodetectors.

Image transducers are here meant to include not only devices for converting an optical image into a video signal, but also devices for converting an image in one portion of the spectrum into an image in another portion of the spectrum, for example, from an invisible portion to the visible portion. The invention is particularly useful at wavelengths longer than 1$\mu$m., ($10^6$ meters or 10,000 A.) i.e. in the infrared region.

Modern image transducers employ a semiconductor used as either a photoemitter or as a photoconductor for sensing the optical image. The image orthicon and image isocon are examples of transducers using photoemission. In these, the quantum energy of the radiation cannot be less than the energy gap between the valence band and the vacuum level for the semiconductor used as the photodetector, and, therefore, they will not detect radiations at wavelengths longer than that corresponding to this energy gap. The vidicon is an example of current image transducers using photoconduction. In this type of conventional photoconductive device the minimum detectable quantum energy level, while less than that for photoemissive devices, cannot be less than the energy gap between the valence band and the conduction band of the semiconductor used as the photodetector, and the wavelength at which the quantum energy equals this energy gap is the maximum that can be detected.

In accordance with the invention, both the increase in sensitivity and the extension of the spectral range of image transducers are accomplished by making use of the energy levels that exist in the gap between the valence and conduction levels of extrinsic semiconductors.

Considering conventional image transducers further in the image orthicon and image isocon the photoemitter converts the optical image into an electron image, and the electron image in turn is converted into a corresponding charge pattern. As a result, the magnitude of the charge on each resolution element of the charge pattern is directly related to the intensity of the radiation in the corresponding elemental area of the optical image. Scanning of the charge pattern with an electron beam produces a video signal and in the process neutralizes the charge. The scanning process, therefore, constitutes a controlled erasure of the stored information and permits movement in the scene to be followed at frame frequency, which can be made relatively high if desired. The high sensitivity of these devices is due largely to the fact that each elemental area of the charge pattern accumulates charge for the full frame interval between scans.

In image transducers which employ photoconductivity and electron beam scanning, such as the vidicon, the optical image is formed on one side of a photoconductive target plate the other side of which is scanned by an electron beam. Each elemental area of the target plate is in effect a small capacitor shunted by the conductance of the target plate at that point, this conductance being directly related to the light intensity at that point in the optical image. The elemental capacitors are connected in parallel in a charging circuit that includes a source of direct current, an output resistor, and the scanning beam. As the scanning beam passes over each elemental area of the target plate, the elemental capacitor associated with it is fully charged. The amount of charge required to fully charge the capacitor depends upon the extent to which the capacitor has discharged through the conductance of the photoconductor during the preceding scanning or frame interval. The extent of discharge in turn depends upon the conductance of the photoconductor at that point as determined by the light intensity in the image at that point. As the beam scans, the variations in the charging current flowing through the output resistor constitute the video signal.

The scanning beam in the vidicon does not affect the conductivity of the target plate and consequently does not erase the information contained in its conductivity pattern. In other words, the recombination of the information carriers, i.e. conduction band electrons, produced in the photoconductor by the incident radiation is not affected by the scanning beam but occurs by a mechanism inherent in the semiconductor used. Further, the recombination rate depends directly upon the number of carriers present. As a result, for a given incident radiation, the number of carriers increases with time until a condition of equilibrium is reached in which the recombination rate equals the carrier formation rate. Therefore, for an image transducer of the vidicon type to follow motion, the photoconductive material must be chosen with an inherent carrier recombination characteristic that permits carrier equilibrium to be attained in less than a frame interval.

In photoconductive image transducers which employ a single photodetector and mechanical scanning, photons from each elemental area of the optical image fall on the photodetector for only a very small portion of the total frame interval, the portion being inversely related to the number of elemental areas.

The sensitivity of an image transducer is a direct function of the portion of the frame interval during which quanta are effectively collected, an effectively collected quanta being one that contributes to the output of the image transducer. In the image orthicon and image isocon mentioned above, quanta are effectively collected for the entire frame interval. In the vidicon and similar devices, quanta collected after carrier equilibrium has been reached do not affect the output, so that quanta are effectively collected for considerably less than a frame interval. Finally, in systems using mechanical scanning and a single photodetector, quanta are effectively collected for a very small portion of the scanning cycle, this portion being inversely related to the number of resolution elements.

In accordance with the invention, the sensitivity of low quantum energy image transducers is increased by providing, through the use of extrinsic semiconductors, a controlled erasure that allows photons to be effectively collected for a very large fraction of the total frame interval.

In the two embodiments of the invention described, both utilize the change in conductivity of the semiconductor for detecting the incident radiation. In one embodiment the extrinsic semiconductor is used in a modified vidicon with a source of pumping radiation for raising electrons from the valence band to the extrinsic level. If the extrinsic level in this case is an empty level, controlled erasure cannot be obtained. However, if the extrinsic level is a donor level, flooding the semiconductor with the pumping radiation triggers recombination of the information carriers in the conduction band with holes in the valence band, as already explained, and makes possible an erasure of the information at the end of each frame. In order that all elemental areas of the target plate receive photons for substantially equal intervals of time between erasure and scanning, the normal vidicon mode should be modified to the extent that the vertical scanning time is a small fraction of the frame interval.

Certain difficulties with the above described embodiment of the photoconductive form of the invention, such as shading due to unequal exposure times for the elemental areas of the target plate and increased video bandwidth due to the faster scanning, are avoided in an embodiment in which both readout and erasure of the information in the photoconductor are accomplished simultaneously for all elemental areas. This embodiment uses a semiconductor with an extrinsic donor level, and the process involves transducing the spatial carrier density distribution of the photoconductive photodetector first into a charge pattern and then into an electron image which is finally converted to a visible image by a phosphor screen.

Figure 2:
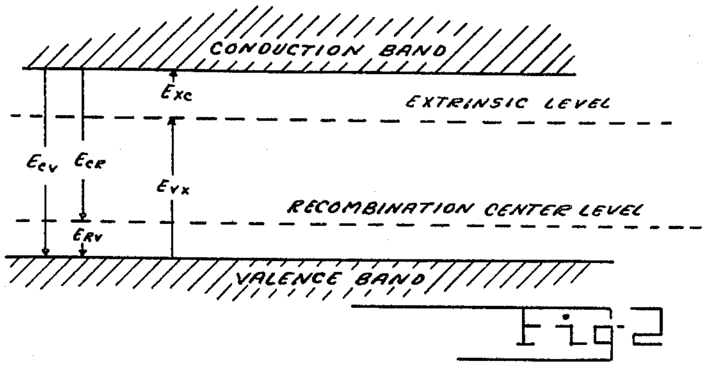
Figure 3:
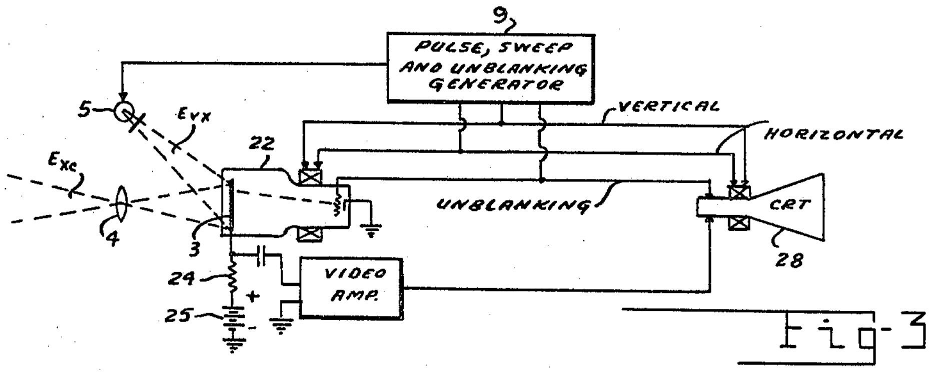
Figure 3A:
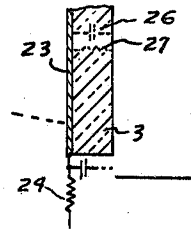
Figure 3B:
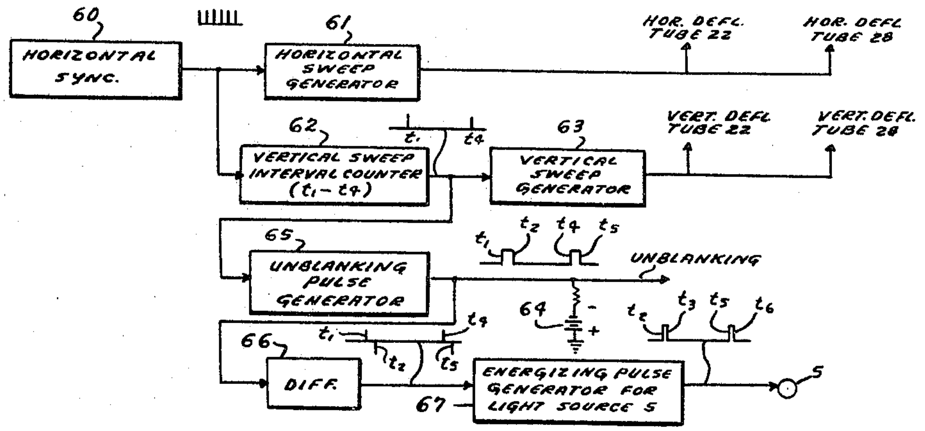
Figure 4:
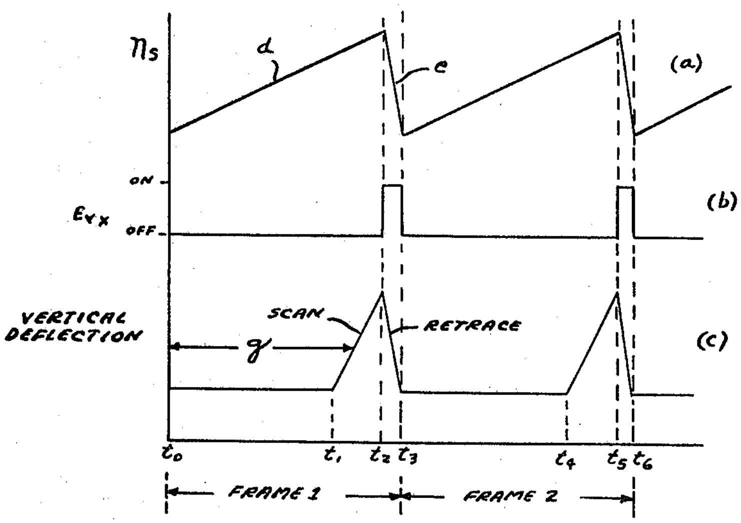
Figure 3:
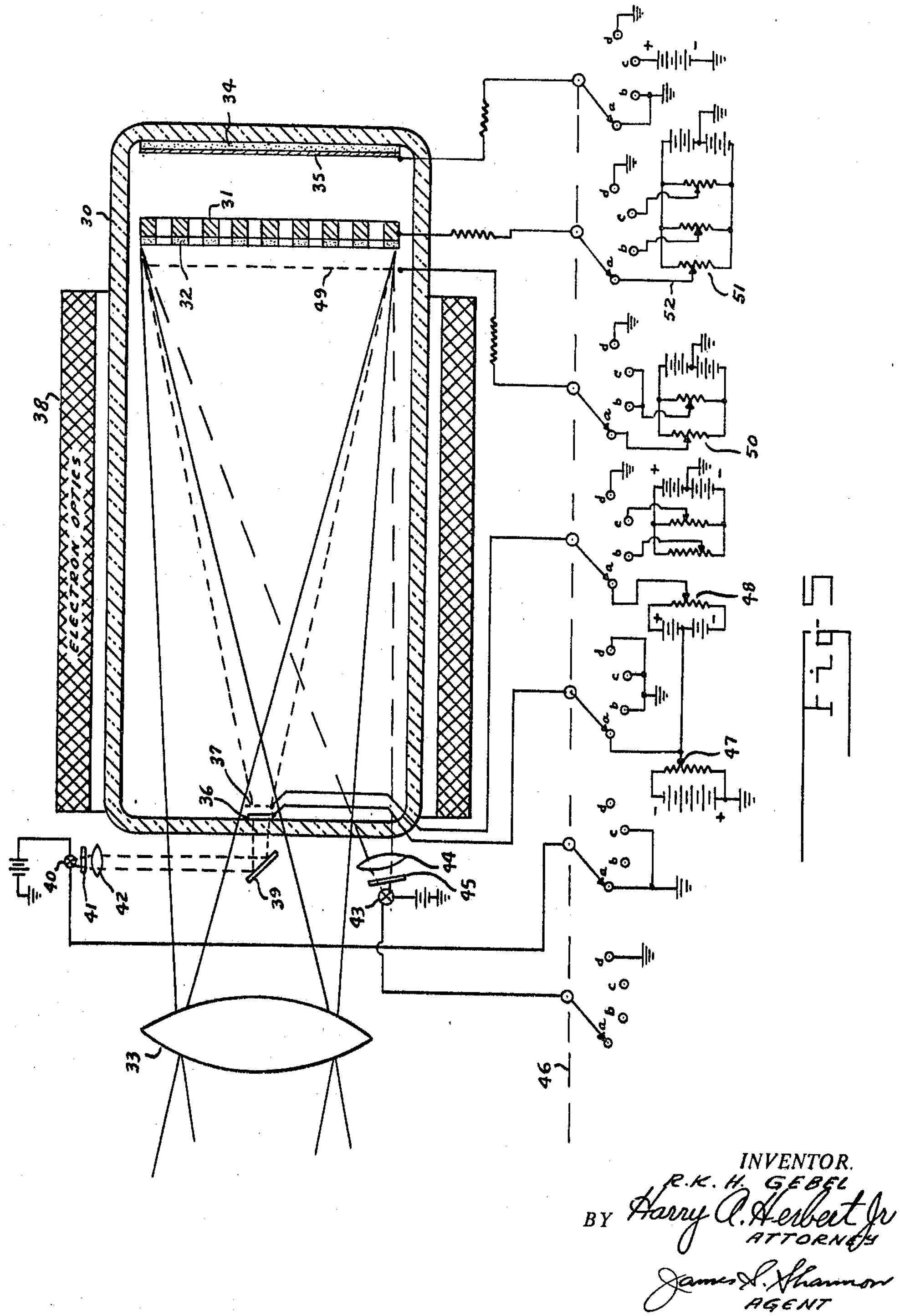
Figure 6:
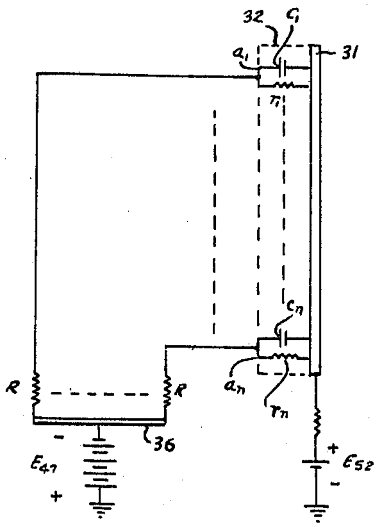
Figure 7:
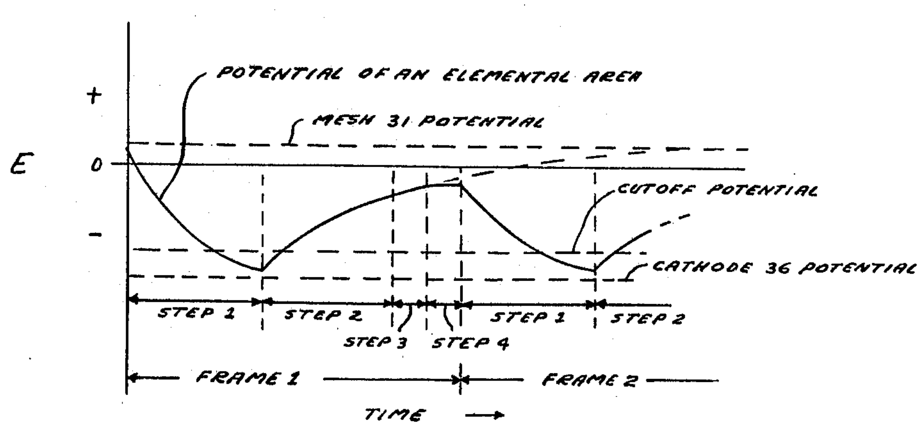

The invention will be described in more detail with reference to the specific embodiments thereof shown in the accompanying drawings in which:

FIG. 1 illustrates uncontrolled and controlled recombination of electrons in a semiconductor, FIG. 2 is a simplified energy diagram of an extrinsic semiconductor as used in the invention, FIGS. 3, 3*a* and 3*b* illustrate a modified vidicon operated in accordance with the invention, FIG. 4 gives waveforms applicable to FIG. 3, FIG. 5 is an embodiment of the invention providing simultaneous readout and simultaneous erasure off all elemental areas of the target plate, FIG. 6 is an equivalent circuit helpful in understanding the operation of FIG. 5, and FIG. 7 shows a waveform applicable to the embodiment of FIG. 5.

The photodetection of an optical image, like the act of vision, may be considered essentially as a counting and a spatial and temporal correlation of the effective number of events of a given species (electrons, grains, nervous excitations, etc.) per resolution element caused by the incident quanta during successive increments of time which depend in length upon the rapidity of motion in the image to be followed.

For image transducers using photoemission, such as the image orthicon and isocon already referred to, in which complete erasure of the information is achieved in each frame, the general equation for the number of primary electrons $n_p$ (photoelectrons plus dark current) for each resolution element per frame is $$n_p = Qt_fH_c + E_Dt_f \qquad (1)$$

where:

Q=number of quanta per second focused onto a resolution element of the photosensor, $H_c$=quantum conversion yield of a photoemissive detector, i.e. the ratio of the number of electrons released by the detector to the number of quanta focused onto it, $E_D$=dark current in electrons per second, $t_f$=frame interval.

From this equation it is seen that, for a given Q, $n_p$ is a linear function of time. When the internal noise of a device, other than the unavoidable minimum conversion noise and the statistical fluctuations of the dark current can be made negligible, a device operating in a mode for which Equation 1 is valid will yield optimum theoretical sensitivity for a given set of parameters.

Equation 1 is not valid for detection when using photoconductivity in a conventional manner, such as in the vidicon. In this case the number of carriers $n_s'$ per resolution element remaining at the time $t_f$ may be expressed as $$n_s' \approx n_o + Qt_fH_s(1-R) \qquad (2)$$

where:

$n_o$=initial number of carriers due to dark current and previously absorbed radiation, Q=number of quanta per second focused onto a resolution element of the photosensor, $H_s$=quantum conversion yield (ratio of the number of carriers produced to the number of quanta focused onto the photoconductor), R=recombination factor, $t_f$=frame interval.

The recombination factor R is a direct function of the number of carriers and hence of the parameters of the equation, and may be determined experimentally.

The rate of recombination $r$ in carriers per second per resolution element may be expressed as $$r = Kn_s^m \qquad (3)$$

where $n_s$ is the number of carriers and K and $m$ depend upon the semiconductor used. The exponent $m \leq 2$ and may be a polynomial because of the complex trapping and recombination effects. For a constant flux of light focused onto the semiconductor, $r$ increases with time until equilibrium is reached between the rate of carriers produced and the rate of recombination. Therefore, the recombination rate for the state of equilibrium, $r_E$, in electrons per second, may be written $$r_E = QH_s \qquad (4)$$

When the state of equilibrium is reached no further increase in the number of carriers occurs without an increase in light flux.

A container into which water is poured at a constant rate, simulating a constant light flux, provides a simple analogy to the modes of photodetector operation defined by Equations 1 and 2. In the case of Equation 1, the container, corresponding to the number of photoelectrons produced, increases linearly with time. In the case of Equation 2, the bottom of the container is a stretchable membrane with a hole through which water constantly flows out of the container. As the weight of water in the container, corresponding to the number of carriers, increases, the size of the hole increases, due to stretching of the membrane, and the outflow increases. When the outflow becomes equal to the inflow, a state of equilibrium is established and no further increase in water in the container occurs.

Curve *a* in FIG. 1 illustrates the operation of a conventional photoconductive image transducer, such as the vidicon, in accordance with Equation 2. As shown, the number of carriers $n_s$ increases with time until the above described condition of equilibrium is reached. In order to detect a sudden change in light flux from one frame to the next, the time required to reach the state of equilibrium in the number of carriers after the flux has changed must be considerably shorter than a frame interval, as illustrated. Under these conditions, the sensitivity of the device is inherently less than it would be if there were no uncontrolled recombination of the carriers and, as a result, the difference between the number of carriers present at the end of a scanning interval and the number present at the beginning were directly proportional to the number of quanta received during the interval.

While it is not possible in a conventional image transducer such as the vidicon to have the number of carriers, for a constant light flux, increase linearly with time during the entire frame interval in a manner analogous to the operation of the image orthicon as expressed by Equation 1, since recombination of the carriers is not effected by the scanning process, it is possible in accordance with the invention to approach this ideal over a large part of the frame interval. The operation in this case may be represented by curve *b* in FIG. 1 in which, neglecting the initially present carriers, the number of carriers, for a constant light flux, increases linearly with time with negligible recombination during the interval $t_0$–$t_1$. Controlled recombination of the carriers then occurs during the relatively short intervals $t_1$–$t_2$. Since recombination cannot be controlled in an intrinsic semiconductor, such operation requires the use of an extrinsic semiconductor having certain extrinsic energy levels in the gap between the valence and conduction bands.

Group II–VI compounds, such as CdS, with the proper impurities and irregularities in crystalline structure, provide suitable extrinsic semiconductors for accomplishing the purposes of the invention. FIG. 2 is a simplified energy diagram of such a semiconductor. If the extrinsic level is an empty level, flooding with radiation of quantum energy $E_{VX}$ raises electrons from the valence band to the extrinsic level leaving holes in the valence band. Absorption of radiation with a quantum energy $E_{XC}$ (infrared) can now induce transition of these electrons to the conduction band from where they recombine with the holes in the valence band either directly, releasing radiation of quantum energy $E_{CV}$, or through a recombination center level releasing radiation of energy $E_{CR}$. If the extrinsic level is a donor level, absorption of radiation of quantum energy $E_{XC}$ raises electrons from this level to the conduction band, leaving holes at the extrinsic donor level which become trapped. This results in a long persistent photoconductivity. If the crystal now absorbs energy with a quantum energy $E_{VX}$, electrons are raised from the valence band to the extrinsic level, filling the trapped holes and leaving holes in the valence band. Recombination then occurs between the conduction band electrons and the holes in the valence band, directly or through a recombination center level, giving off radiation of energy $E_{CV}$ or $E_{CR}$, as before.

Semiconductor crystals which have the behavior described above may be used as target plates for the detection of images formed by radiation with quantum energy of either $E_{XC}$ or $E_{VX}$. Although in FIG. 2 the extrinsic level is shown closer to the conduction band than to the valence band, it can be anywhere in the gap. However, one of the two energy differences must be less than the quantum energy of the radiation to be detected.

As indicated earlier, the two embodiments of the invention disclosed both utilize the change in conductivity that occurs when electrons are raised from the extrinsic level to the conduction band. The least complicated of these simply uses a semiconductor with an extrinsic donor level as the target plate in a conventional vidicon with a modified vertical sweep and provisions for flooding, as illustrated in FIG. 3.

Referring to FIG. 3, an extrinsic semiconductor 3 of the type illustrated in FIG. 2 and in which the extrinsic level is a donor level is used as the target plate of a conventional vidicon 22. The plate 3 receives the infrared image, formed by optical system 4, through a transparent conductive layer 23, shown in the enlarged view of FIG. 3*a*, which is connected through output load resistor 24 to a source of direct current 25. Each elemental area of the target plate may be represented by a small capacitor 26 shunted by a resistor 27 (FIG. 3*a*) representing the conductance of the target plate at that point. When the beam of tube 22 scans each elemental area it, in effect, connects one side of the elemental capacitor to ground, allowing the capacitor to fully charge from source 25 through load resistor 24 and conductive coating 23. In the interval between scans the capacitor discharges through conductance 27 by an amount that depends upon the value of this conductance, which in turn depends upon the intensity of the infrared radiation at that point in the infrared image. The charging current in load resistor 24 at each scan of an elemental area is directly related to the extent of discharge of the elemental capacitor during the preceding scanning interval and therefore to the radiation intensity at that point in the image. Consequently, this current constitutes the video signal output of the tube. This may be amplified and converted to a visual image by a cathode ray tube indicator 28 the scanning of which is synchronized with that of tube 22.

The operation of FIG. 3 is illustrated in FIG. 4. During the intervals $t_0$–$t_2$, $t_3$–$t_5$, etc., the infrared radiation of quantum energy $E_{XC}$ falling on plate 3 raises electrons from the extrinsic level (FIG. 2) to the conduction band, the number $n_s$ so raised for any resolution element of the target plate depending upon the infrared intensity at that point and increasing with time, as illustrated by part *d* of waveform *a*. During the intervals $t_2$–$t_3$, $t_5$–$t_6$, etc., which are the vertical retrace intervals of the scanning cycles, source 5 is energized by a pulse, supplied by generator 9 and illustrated by waveform *b*, causing the target plate 3 to be flooded by light of quantum energy $E_{VX}$. This radiation raises electrons from the valence band to the extrinsic level (FIG. 2) filling holes left by the prior action of $E_{XC}$ and leaving holes in the valence band with which the electrons previously raised to the conduction band by $E_{XC}$ recombine, as illustrated by part *e* of waveform *a*. Scanning of the target plate by the electron beam of the tube 22 takes place during the relatively short intervals $t_1$–$t_2$, $t_4$–$t_5$, etc.

For any particular resolution element on the target plate the operation of FIG. 3 approaches that represented by Equation 1 to the extent that the interval between erasure of the information carriers, by flooding wih light of energy $E_{VX}$ as described above, and scanning of the particular element approaches the frame interval $t_0$–$t_3$. This interval varies from $t_0$–$t_1$ for the first element scanned to $t_0$–$t_2$ for the last element scanned, being represented in general by the interval *g* in FIG. 4. It is apparent that the extent of the variation depends upon the length of the scanning interval $t_1$–$t_2$ which therefore should be made as short as practicably possible.

FIG. 3*b* illustrates one suitable embodiment of block 9 in FIG. 3. Synchronizing pulse generator 60 produces pulses at the horizontal scanning frequency which trigger horizontal sweep circuit 61 to produce the proper energization of the horizontal sweep elements of tubes 22 and 28. The interval between the start of successive vertical scans, the interval $t_1$–$t_4$ as seen in FIG. 4, is measured off by counter 62 which counts horizontal pulses and produces a vertical synchronizing pulse each time a count corresponding to the desired interval has been completed. The vertical pulses trigger vertical sweep circuit 63 which energizes the vertical deflection elements of tubes 22 and 28. The beams of tubes 22 and 28 are normally biased to cutoff by source 64. The vertical synchronizing pulses also trigger unblanking pulse generator 65 which produces pulses of the proper duration to unblank the beams during the vertical scan intervals $t_1$–$t_2$, $t_4$–$t_5$, etc. The unblanking pulses are differentiated by circuit 66 to produce sharp positive-going and negative-going pulses at their leading and trailing edges, respectively. Light pulse generator 67 responds only to the negative-going pulses to produce pulses energizing light source 5 during the vertical retrace intervals $t_2$–$t_3$, $t_5$–$t_6$, etc.

In FIG. 3, the nonuniformity in effective exposure times for the different resolution elements may be objectionable, as may also be the increased video bandwidth caused by the shortened scanning time. These difficulties are avoided in the embodiment shown in FIG. 5, which achieves readout and erasure of the carriers in the photoconductive target plate for all elemental areas simultaneously.

Referring to FIG. 5, an evacuated envelope 30 contains a target plate in the form of a conductive mesh 31 on one side of which is deposited a coating 32 of an extrinsic semiconductor having an energy band structure of the type shown in FIG. 2. The infrared image to be detected is focused on the photoconductive surface 32 by a suitable lens system 33. On the inner surface of the end of tube 30 is deposited a phosphor layer 34, and over that an electron pervious conductive layer 35, such as a thin coating of aluminum. A source of electrons 36 and a control grid 37 therefor are placed inside the tube at the opposite end. Suitable electron optics 38 together with the accelerating field produced by the relatively positive target plate and electrode 49 cause electrons emitted by source 36 to be directed toward the target plate. The electron source should introduce no heat into the tube and therefore, in the embodiment illustrated, it consists of a photocathode which, with the help of reflector 39, receives light energy from source 40 through infrared absorbing filter 41 and lens system 42. Provision is also made for flooding the photoconductive side of the target plate 32–31 by light from a source 43 using a suitable lens system 44 and a filter 45 to select from the source light of the proper quantum energy, as will be explained more fully later.

The operation of FIG. 5 is under control of a cyclic programming switch 46, each cycle of operation comprising four steps. For a photoconductor 32 in which the extrinsic level (FIG. 2) is a donor level, the four steps are as follows:

Step 1

The purpose of this step is to establish the surface of photoconductor 32 at its initial or starting potential which is close to that of photocathode 36 and negative relative to ground. With switch 46 on its *a* contacts, light source 40 is energized, photocathode 36 is connected to a point 47 that is negative relative to ground, and control grid 37 has a suitable bias relative to the photocathode provided by potentiometer 48. Grid 49 and conductive mesh 31 are connected to points on potentiometers 50 and 51 that are at or near ground potential. Light from source 40 directed onto photocathode 36 causes electrons to be emitted which travel toward the relatively positive grid 49 and strike the photoconductive surface 32. If the parameters are such that the secondary emission ratio is less than unity, the surface of photoconductor 32 acquires negative charge and its potential falls. The process is illustrated in more detail in FIGS. 6 and 7.

Referring to FIG. 6, each of the like elemental resolution areas $a_1$–$a_n$ of the photoconductor 32 may be simulated by a smal capacitor shunted by a resistor, representing, respectively, the suiface of 32 to mesh 31 capacitance and the resistance of the photoconductor at that point. The electrons flowing between photocathode 36 and the elemental areas $a_1$–$a_n$ constitute parallel conductive connections of low resistance R between these areas and the photocathode. The photocathode 36 has a potential of $-E_{47}$, the potential of point 47 in FIG. 5, and mesh 31 has a small potential of $+E_{52}$, the potential of point 52 in FIG. 5. Step 1 is made long enough for each elemental capacitor *c* to charge to a potential of $$\frac{r}{R+r}(E_{47}+E_{52})$$

Since *r* is inversely related to the intensity of the infrared image at the particular point on the photoconductor 32, the charges reached by the capacitors *c* will vary inversely with the infrared intensity in the image and the surface of photoconductor 32 will have a negative potential pattern corresponding inversely to the image intensity pattern.

The Step 1 portion of FIG. 7 illustrates the above described operation for a single elemental area.

In an alternative method to the above, the same negative potentials at the elemental areas could be obtained by having the photocathode 36 at ground potential and applying a positive pulse to mesh 31. che elemental capacitors would rapidly charge through the low resistance of the electron stream but could discharge after the pulse is removed only through the resistance of the photoconductor. This mode of operation could be accomplished in FIG. 5 by placing contact 47 at ground potential and contact 51 at a higher positive potential.

Step 2

The purpose of this step is to increase the contrast in the negative potential image on the surface of photoconductor 32. During this step, switch 46 is on its *b* contacts which deenergizes light source 40, grounds photocathode 36 and places a negative bias on grid 37 to prevent any possible emission from the photocathode. Since $r_1$–$r_n$ differ in accordance with the infrared intensity distribution and since $c_1$–$c_n$ are all of the same value, the time constants $r_1c_1$–$r_nc_n$ differ and the capacitors discharge at different rates. The discharge of a single capacitor is illustrated in the Step 2 portion of FIG. 7. By proper choice of the time interval for Step 2 the difference in discharge rates will result in a wider range of potentials on the surface of photoconductor 32 than was present at the start of the step.

Step 3

In this step an electron flow is produced through the holes in target plate 31–32 that is representative of the potential distribution on the surface of photoconductor 32. With switch 46 in its *c* position, light source 40 is reenergized and electrodes 37, 49 and 31 are provided with proper potentials to flood the target plate with low velocity electrons. The number of electrons that enter any hole in the target is determined by the potential on the elemental area containing the hole. The highest potential any area can have is that of mesh 31 which represents a completely discharged elemental capacitor. If the potential of an elemental area is more negative than a value represented by the cutoff line in FIG. 7, no electrons will enter the holes in that area but will return to electrode 49. Therefore, the duration of the previously described Step 2 should be so selected that, by the end of the interval, all elemental areas will have risen above cutoff potential but none will have reached the potential of element 31. Further, Step 3 should not be so long that it cannot be completed before the elemental areas have significantly changed their potentials. The electrons passing through the holes of the target constitute an electron image having a density distribution directly related to the intensity distribution in the infrared image. The high potential applied to conductive coating 35 in this step accelerates the electrons toward the phosphor 34 where they produce a visual representation of the infrared image. Suitable electron optics, not shown but well understood in the art, may be used to maintain focus.

Step 4

The purpose of the final step in the cycle of operation is erasure. This is accomplished through a recombination of conduction band electrons with holes in the valence band. During Steps 1, 2 and 3, the infrared radiation of the image focused on the target plate, of quantum energy $E_{XC}$ (FIG. 2), is effective in raising electrons from the donor extrinsic level to the conduction band of the extrinsic semiconductor 32, leaving holes at the donor level. During Step 4, when light source 43 is energized and electrodes 36, 37, 49, 31 and 35 grounded, light of quantum energy $E_{VX}$, passed by filter 45, floods the surface of photoconductor 32. This raises electrons from the valence band to the donor level, filling the holes at the donor level. The conduction band electrons then recombine with the resulting holes in the valence band with the result that the information stored in the conductivities of the various elemental areas is erased preparatory to the start of a new cycle of operation.

As stated earlier, photons are effective in increasing the conduction band electrons, and therefore are effective in influencing the output, in Steps 1, 2 and 3. Erasure of the conduction band electrons occurs in Step 4. Therefore, the operation of FIG. 5 approaches the type represented by Equation 1 to the extent that the time devoted to Steps 1, 2 and 3 approaches the complete cycle interval. Since Step 4 may be made of short duration, the operation closely approaches Equation 1.

If the persistence of phosphor 34 is longer than an operating cycle of the apparatus in FIG. 5, a continuous visual image appears on the screen. If desired, this image could be converted to a video signal by optical application to the photocathode of an image orthicon or isocon, or, alternatively, the mesh and target plate of these tubes could be substituted for the electrode 35 and phosphor 34 of FIG. 5 to receive the electron image emerging from the target electrode 32–31.

As stated, cadmium sulfide (CdS) is a suitable semiconductive material for the target electrodes of the described image transducers. Methods of growing single crystals of CdS large enough for this purpose are known in the art and described in the literature, for example, in an article entitled "Method for Growing Large CdS and ZnS Single Crystals," by Greene, Reynolds et al., appearing in The Journal of Chemical Physics, vol. 29, No. 6, pages 1375–1380, December 1958. While there is no process known with 100 percent reproducible results for growing extrinsic crystals of CdS with a donor level in the energy gap, the process described in the above article will provide a fair number of such crystals which may be identified by tests.

I claim:

1. A low quantum energy optical image transducer comprising: a target plate for receiving said optical image made of a semiconductor having an extrinsic donor level in the energy gap between the valence and conduction bands that is separated from the conduction band by an energy gap not greater than the quantum energy of the radiation forming the image; normally deenergized means for flooding said target plate with light having a quantum energy corresponding to the energy gap between the valence band and said extrinsic level; vertical scanning means and concurrently operating horizontal scanning means for sequentially scanning the elemental areas of said target plate with an electron beam for producing a video signal representative of the conductivities of the elemental areas; means for initiating operation of said vertical scanning means at a repetition rate the period of which is long relative to the vertical scanning time; and means synchronized with the vertical scanning means and operative at the end of each vertical scan and during the vertical retrace interval to energize said flooding means.

2. Apparatus as claimed in claim 1 in which said electron beam is normally blanked and in which means synchronized with said vertical scanning means are provided for unblanking said beam during each vertical scan.

3. Apparatus as claimed in claim 1 and in addition a cathode ray tube reproducer having vertical and horizontal scanning means synchronized with the vertical and horizontal scanning means for said target plate and having a video input; and means for applying said video signal to said video input.

4. An image transducer for an optical image of low quantum energy radiation comprising: a target plate consisting of a conductive mesh having a coating on one side of a semiconductor having an extrinsic level in the energy gap between the valence and conduction bands that is separated from the conduction band by an energy gap not greater than the quantum energy of the radiation forming said image; optical means for forming said image of low quantum energy radiation on the semi-conductive side of said target plate; a normally deenergized source of electrons together with electron optics for flooding the semiconductive side of said target plate with electrons; a normally deenergized light source for flooding the semiconductive side of said target plate with light having a quantum energy corresponding to the energy gap between the valence band and the extrinsic level of said semiconductor; an electron pervious accelerating electrode situated opposite and spaced from the conductive mesh side of said target plate; a cyclic controller for said image transducer operating in four successive steps per cycle; said controller having means operative in its first step to energize said electron source and to establish it at a negative potential relative to said conductive mesh; said controller having means operative in its second step to deenergize said electron source and establish it at approximately the same potential as said conductive mesh for a predetermined period; said controller having means operating in its third step to energize said electron source, establish said conductive mesh at a positive potential relative to said electron source and establish said accelerating electrode at a positive potential relative to said conductive mesh, the resulting electrons passing through the openings in said target plate and accelerated toward said accelerating electrode constituting an electron image corresponding directly to said optical image; and said controller having means operating in its fourth step to energize said light source for a predetermined period.

5. Apparatus as claimed in claim 4 and in addition a phosphor screen situated to receive the electrons passing through said accelerating electrode for converting said electron image into a visual image.

References Cited

UNITED STATES PATENTS

| | | | |
|---|---|---|---|
| 2,727,183 | 12/1955 | Marshall | 315—11 |
| 2,805,359 | 9/1957 | Thiele | 315—11 |
| 3,031,574 | 4/1962 | Halsted | 250—71 |
| 3,070,698 | 12/1962 | Bloembergen | 250—83.3 |
| ?,188,467 | 6/1965 | Weissenberg | 250—71 |

ROBERT L. GRIFFIN, Primary Examiner

J. A. ORSINO, Jr., Assistant Examiner

U.S. Cl. X.R.

178—7.2; 250—71.5, 83.3; 313—65; 315—10